United States Patent Office 2,781,055
Patented Feb. 12, 1957

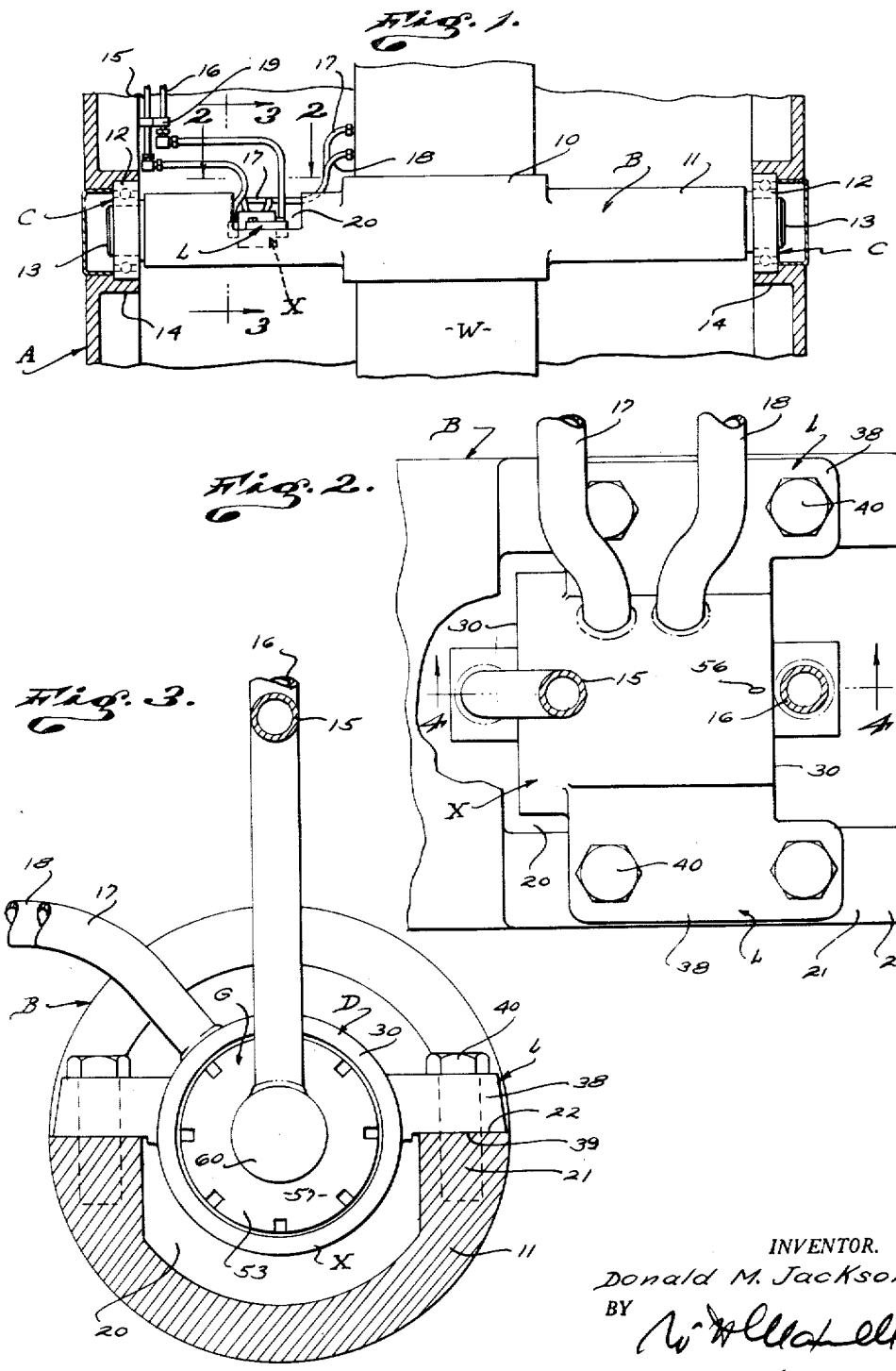

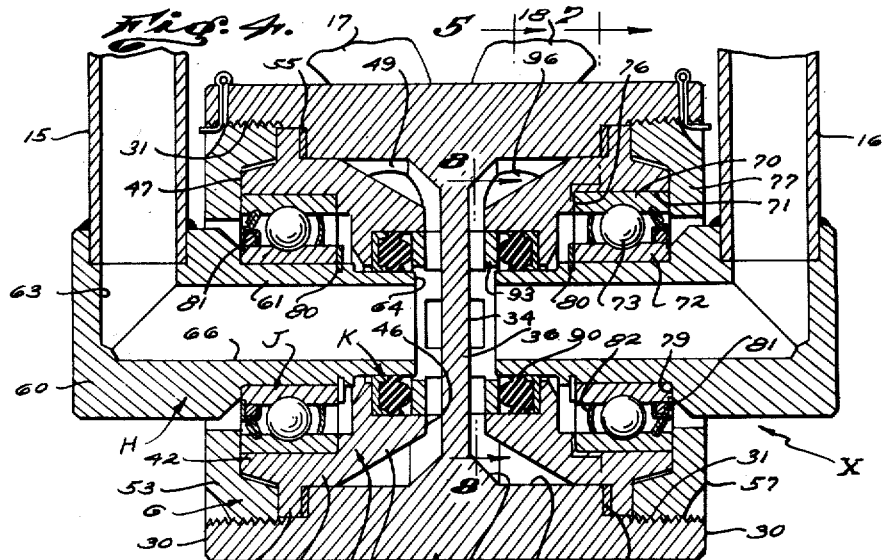

2,781,055

APPARATUS FOR HANDLING FLUID

Donald M. Jackson, Fullerton, Calif., assignor to Chiksan Company, Brea, Calif., a corporation of California Application May 11, 1951, Serial No. 225,825

8 Claims. (Cl. 137—580)

This invention relates to apparatus for handling fluid, and it is a general object of the invention to provide a simple, practical, dependable and compact structure for handling fluid between two parts or elements related for relative rotary motion.

The present invention is such that it can be applied to or incorporated in structures of various kinds. However, it is particularly practical as applied to or as combined with elements related for relative rotary motion. As a typical example, the invention can be advantageously incorporated in structure where there is a stationary part such as a frame and a part adapted to experience pivotal or rotary motion, such as a shaft or trunnion, and the structure serves to handle fluid between such elements or relatively moving parts, and in a preferred form, it will advantageously handle two streams of fluid.

A general object of the present invention is to provide a construction of the general character referred to wherein a pivotally movable element is supported by a frame, or the like, and a fluid handling coupling is carried in a recess in the pivotally movable element and conducts fluid through a swivel joint, the axis of which is coincidental with the pivotally movable element.

Another object of the invention is to provide structure of the general character referred to, in which, two fluid handling joints or swivel connections are incorporated in a single body and are in a compact form or relationship so that the fluid handling coupling is of limited size and can be incorporated in the rotatable element without projecting therefrom in a manner to interfere with other parts or equipment.

Another object of the invention is to provide apparatus of the general character referred to including, a form of fluid handling joint or swivel connection embodying adequate anti-friction bearings and adequate packing means, and having substantial fluid capacity, while at the same time being of limited diameter and also of limited extent axially.

Another object of the invention is to provide apparatus or structure of the general character referred to, involving various improved, simple, practical arrangements and relationships of parts that make for a practical, effective, dependable construction.

In a typical application of the invention, there is a stationary or fixed part such as a frame, and a rotor supported by or from the frame through suitable mounting means. The rotor may be a shaft or an element such as a work carrier and when in that form it may involve a work carrying portion or collar and aligned shaft portions or trunnions. The mounting means may involve bearings on or at the ends of the trunnions and carried by the frame so that the rotor is supported for oscillatory rotary movement. Fluid handling ducts are provided and are stationary, and these ducts can be carried by or may be rigid with the frame. Movable fluid handling ducts are provided and may be related to the rotor or to work, or the like, carried thereby to shift with the rotor. A fluid handling coupling is provided between or connects the stationary and movable ducts, and in the preferred form it handles two separate streams of fluid and it has a pivotal axis coincidental with that of the rotor. With the construction of the invention, the stationary ducts connect to stationary parts of the coupling while the movable ducts connect to a movable part of the coupling, with the result that the rotor may move relatively to the frame without flexure, movement, distortion, or any sort of operation of the ducts.

The coupling is characterized by an elongate body with sockets entering it from its ends. The sockets terminate in the body so that they are spaced apart, leaving a partition centrally located in the body. A mounting means for the body serves to rigidly secure it to the rotor, for instance, in a socket provided in one side of a trunnion, the mounting being such as to support the body so that it is coaxial with the rotor. A fluid handling core enters each socket and has a head at its outer end beyond the end of the body, to which a stationary duct is connected and through this connection the core is held stationary. An elongate tubular portion of the core is disposed within the socket and terminates short of the bottom of the socket so that free communication is provided between the bottom portion of the socket and the duct connected to the head. An insert is provided in the socket and carries a core bearing and packing means. A clamp ring is threaded in the socket to hold or clamp the insert tightly in place. The insert has a middle portion with a flange that is engaged by the clamp ring, an outer end portion in the outer end portion of the socket, and an inner end portion in the inner end portion of the socket, but terminating short of the bottom of the socket. The core bearing is preferably an anti-friction bearing with an outer race in the insert retained by a flange on the clamp ring, and an inner race on the tubular portion of the core and balls between the races.

The packing means involves a packing ring on the inner end of the tubular portion of the core, a seat ring supporting the packing ring and a compression ring supported by the bottom of the socket and extending into the insert and engaging the packing ring where it surrounds the core. A lateral port is provided in the body communicating with the socket opening, and a duct that is movable with the rotor is connected with this port. As a result of the construction and arrangement, the core is supported for rotary motion with respect to the insert which is held tightly in the socket and an adequate fluid connection or passage is provided communicating with the port in the body and the duct communicating with the head of the core.

The various objects and features of my invention will be fully understood from the following detailed description of a typical preferred form and application of the invention, throughout which description reference is made to the accompanying drawings, in which:

Fig. 1 is a view of a typical structure embodying the present invention, showing a rotor supported in a frame through suitable bearings and showing the coupling connecting ducts stationary with the frame, and ducts stationary with the rotor, certain of the parts being broken away to be shown in section. Fig. 2 is an enlarged view taken substantially as indicated by line 2—2 on Fig. 1. Fig. 3 is an enlarged section taken substantially as indicated by line 3—3 on Fig. 1. Fig. 4 is an enlarged longitudinal detailed sectional view taken as indicated by line 4—4 on Fig. 2. Fig. 5 is a transverse sectional view taken as indicated by line 5—5 on Fig. 4. Fig. 6 is an enlarged view of a portion of the structure shown in Fig. 4, being a view showing details of the packing construction. Fig. 7 is a transverse sectional view taken as indicated by line 7—7 on Fig. 4, and Fig. 8 is a view taken as indicated by line 8—8 on Fig. 4.

In the particular form or adaptation of the invention illustrated in the drawings, there is a frame A carrying a rotor B through bearing means C, and the rotor carries suitable structure or work W. The frame A may be considered as a fixed or stationary structure, and in the case illustrated, the rotor B has a collar 10 that carries the work W, and has shaft portions or trunnions 11 projecting from opposite sides of the collar to be concentric with each other. The bearing means C involves anti-friction bearings 12 on reduced ends 13 of the trunnions, the bearings being held in suitable mountings 14 provided in the frame A.

In the particular case illustrated, the invention is in a form designed to handle two separate streams of fluid, and in this case there are two ducts 15 and 16 that are not movable. In the particular case illustrated, the stationary ducts 15 and 16 are held stationary by brackets 19 by which these ducts are secured to the frame A. The movable ducts 17 and 18 are shiftable with the rotor or with the assembly formed by the rotor and work, and they are shown in Fig. 1 applied to one side of the work W.

In the structure of the present invention, the rotor is provided with a recess to carry or accommodate coupling X which connects the ducts hereinabove described, that is, the stationary ducts with the movable ducts. In the particular case illustrated, the coupling carrying recess is provided in one of the trunnions 11 of the rotor and is shown as entering the trunnion from one side and extending deeply into the rotor to establish a recess or chamber 20 therein of such size and shape as to adequately accommodate the coupling X. In the particular case illustrated, the recess is so formed in the trunnion 11 as to provide the trunnion with spaced side portions 21, with tops or edges 22 which are flat, and in a common plane extending longitudinally of the trunnion and intersecting the central axis thereof. In the drawings, I have illustrated the coupling carrying recess as the only such opening or cavity provided in the trunnion, whereas, it is to be understood that so far as this invention is concerned, the trunnion or the rotor, generally, can be shaped, formed or apertured to carry any other suitable accessories, device, or equipment, as circumstances may require.

The coupling provided by the present invention involves, generally, a body D having sockets entering it from the ends, and inserts F arranged in the sockets and held therein by suitable mounting means G. Cores H are supported in the inserts by bearings J and are sealed by suitable packing means K. In the particular case illustrated, the stationary ducts 15 and 16 connect to the cores H while the movable ducts 17 and 18 connect to the body D which is secured to the rotor by mounting means L so that it moves with the rotor and consequently is stationary relatively to the ducts 17 and 18.

The body D is an elongate element, and in a typical case, it may be round in cross-section with flat ends 30 normal to its longitudinal axis. In a preferred form of the invention, a socket enters the body D from each end and the sockets are preferably alike. In the case illustrated, each socket has an outer or mouth portion 31 opening at the end 30 of the body and terminating at a shoulder 32. The mouth portion 31 is the largest portion of the socket, as clearly illustrated in Fig. 4 of the drawings. A reduced portion or counterbore 33 extends inwardly from the shoulder 32 and the socket terminates at a flat bottom 34. The counterbore 33 may be continuous or uninterruptedly into the bottom 34, or a portion or fillet 35 may be provided as shown in Fig. 4. The bottom 34 may be flat and plain, and the bottoms of the two sockets are spaced apart so that the body has a wall or partition 36 therein located at the center of the body or midway between the ends 30.

The mounting means L provided for supporting the body D serves to secure the body D to the rotor as, for instance, to the trunnion 11 which is recessed and it so supports the body that its central longitudinal axis is coincidental with that of the recessed trunnion. In the form illustrated, the mounting means L involves lugs or flanges 38 on opposite sides of the body D and having faces 39 which are in a common plane extending longitudinally of the body and intersecting the central longitudinal axis thereof. The parts are proportioned so that, when the faces 39 of the flanges 38 are engaged with the edges or faces 22 of the sides 21 of the trunnion, the body D is supported in the desired position centrally of the trunnion. Suitable fasteners may be provided for holding the parts in this relationship, and in the drawings, screw fasteners 40 are shown securing the flanges to the sides 21.

Whereas two separate, independent cores H are provided and each core H is mounted in one of the sockets by mounting means individual to that core, the two cores are of identical construction, as are also the two sets of mounting means, and therefore a description of but one core H and its associated mounting means will suffice for the purposes of the present disclosure.

The insert F provided in each body socket is preferably formed so that it has a central or middle portion 41 that is carried in the counterbore 33 of the socket adjacent the shoulder 32, while an outer end portion 42 projects forward from the middle portion and into the mouth portion 31 of the socket, and an inner end portion 43 projects inwardly from the middle portion, well into the counterbore and terminates so that its inner end 46 is spaced from the bottom 34 of the socket, providing a fluid passage between these parts.

In the preferred form of construction, the insert F is turned at its middle portion 41 so that it slidably fits into the counterbore while the outer end portion 42 projects forward and converges somewhat, the forward or foremost end 47 of the insert being flat and in a plane normal to the longitudinal axis of the structure and disposed within the mouth opening 31 of the socket. The inner end portion 43 of the insert converges or decreases in diameter as it extends from the middle portion 41 to the inner end 46, leaving an annular chamber or manifold passage 49 of substantial capacity in the counterbore portion of the socket around the inner end portion 43 of the insert. The chamber 49 is open to or in free communication with the fluid passage occurring between the end 46 of the insert and the bottom 34 of the socket.

The mounting means G, holding or supporting the insert, preferably involves a flange 50 projecting from the middle portion 41 of the insert F or from the insert where the portions 41 and 42 join, and a clamp ring 53 carried in the mouth portion of the socket to clamp the flange 50 against the shoulder 32. In the case illustrated, the clamp ring 53 is threaded into the mouth portion of the socket and clamps the flange tightly against the shoulder 34 with a suitable washer or sealing ring 55 between the flange and the shoulder. A suitable lock, such as a key 56, locks the clamp ring in the desired set position. In the preferred form of the invention, the parts are proportioned so that when the clamp ring is in operating position, its outer end 57 is substantially flush with the end 30 of the body.

The core H, in its preferred form, involves an outer end or head portion 60 outward of or beyond the end 30 of the body, and a tubular inner portion 61 located in and extending axially through the insert F concentrically therewith. In the case illustrated, the head 60 is provided with a port 63, and a stationary duct is joined or connected to the head 60 to be in communication with the port 63. In the particular case illustrated, the duct 15 connects to one side of the head 60 and therefore projects laterally from the coupling, as shown throughout the drawings. The inner or tubular portion 61 of the core is substantially coextensive with the insert and the inner end 64 of the core terminates short of the bottom 34 of the socket so a fluid passage is provided between these parts. Through the construction just described, the opening or passageway 66, extending centrally and longitudinally through the portion 61 of the core, establishes a fluid connection between the port 63 and the hereinabove described fluid handling passageways in the inner portion of the socket.

The bearing or mounting means J, provided for rotatably supporting the core in the insert F, is preferably an anti-friction bearing, and in the case illustrated, it is a ballbearing involving an outer race 70 carried in a race oppening 71 entering the insert from its outer end 47, an inner race 72 supported on the portion 61 of the core adjacent the head 60, and an annular series of balls 73 between the races 70 and 72. The race opening 71 extends into the insert from end 47 and terminates at a shoulder 76 against which the race 70 bears. A retainer or flange 77 projecting inwardly from the clamp ring 53 overhangs the outer end of the race 70 and serves to retain the race in the desired operating position. The race 72 is carried on portion 61 of the core adjacent the head 60 and it abuts the inner end 79 of the head. A suitable means such as a spring retainer 80 is carried by the core portion 61 and holds the race 72 against axial displacement.

In practice, the bearing construction just described may include suitable seals or means for retaining lubricants. The instance, as shown in the drawings, a seal is provided at 81 and also at 82.

The packing or sealing means K, preferably, involves an annular body or ring 90 of packing engaged around the inner end portion of the core and seated in a packing receiving bore 91 entering the inner end portion 43 of the insert F from the end 46 thereof. In the particular case illustrated, a seat ring 92 supports the packing ring 90 and a compression ring 93 is supported in the bore 91 and bears against the packing ring 90 to exert the desired pressure thereon. In accordance with the invention, the compression ring 93 is supported from the bottom 34 of the socket and this support involves spaced lugs 95 on the ring 93 bearing against the bottom and providing a plurality of fluid passages 94 between the ring 93 and bottom 34 so that free passage is maintained between the opening 66 through the core and the chamber 49 provided in the socket around the inner portion 43 of the insert.

A fluid handling port 96 is provided in the body, and in the case illustrated, it extends radially outward in the body from the inner end portion of counterbore 43 and a movable duct is connected with the body to be in communication with the port 96, as clearly shown in Fig. 5 of the drawings. The port 96 is opposite the exterior of the insert portion 43, and is in open communication with the chamber 49, as clearly illustrated throughout the drawings.

With the construction of the present invention, the coupling X connects the stationary and movable ducts, and provides two separate fluid handling connections that allow for free movement of the rotor relative to the frame, while the stationary ducts 15 and 16 remain stationary relatively to the frame and the movable ducts 17 and 18 move with or are carried by the rotor or parts carried thereby. The swivel joint construction is of limited size both radially and axially, and thus provides a coupling device which can be advantageously located in a recess provided in a trunnion, or the like, without materially weakening the trunnion and without interfering with other parts, device or equipment that may be carried by or related to the trunnion.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A fluid handling structure including, an elongate body with a socket entering it from one end, the socket having a mouth portion at the end terminating at a shoulder and a counterbore extending in from the shoulder and terminating at the bottom of the socket, there being a fluid handling port in the body communicating with the inner end portion of the counterbore, an insert in the socket with a middle portion in the outer end of the counterbore, an inwardly convergent inner portion extending inward from the middle portion and terminating short of the bottom, and an outer portion extending forward from the middle portion and terminating in the mouth portion, a flange on the insert supported by the shoulder, a clamp ring threaded in the mouth portion clamping the flange toward the shoulder, a core with a head outward of the end of the body and a tubular portion in the insert and terminating short of the bottom, a bearing on the tubular portion and supported in the insert rotatably carrying the core in the insert, and packing means between the inner end portion of the core and the insert, the head having a port in communication with the tubular portion of the core.

2. A fluid handling structure including, an elongate body with a socket entering it from one end, the socket having a mouth portion at the end terminating at a shoulder and a counterbore extending in from the shoulder and terminating at the bottom of the socket, there being a fluid handling port in one side of the body communicating with the inner end portion of the counterbore, an insert in the socket with a middle portion in the outer end of the counterbore, an inwardly convergent inner portion extending inward from the middle portion and terminating short of the bottom, and an outer portion extending forward from the middle portion and terminating in the mouth portion, a flange on the insert sealed with and supported by the shoulder, a clamp ring threaded in the mouth portion clamping the flange toward the shoulder, the outer end of the ring being substantially flush with the end of the body, a core with a head outward of the end of the body and a tubular portion in the insert and terminating short of the bottom, a bearing on the tubular portion and supported in the insert rotatably carrying the core in the insert, and packing means between the inner end portion of the core and the insert, the head having a port in communication with the tubular portion of the core.

3. A fluid handling structure including, an elongate body with a socket entering it from one end, the socket having a mouth portion at the end terminating at a shoulder and a counterbore extending in from the shoulder and terminating at the bottom of the socket, there being a fluid handling port in the body communicating with the inner end portion of the counterbore, an insert in the socket with a middle portion in the outer end of the counterbore, an inwardly convergent inner portion extending inward from the middle portion and terminating short of the bottom, and an outer portion extending forward from the middle portion and terminating in the mouth portion, a flange on the insert supported by the shoulder, a clamp ring threaded in the mouth portion clamping the flange toward the shoulder, a core with a head outward of the end of the body and a tubular portion in the insert and terminating short of the bottom, a bearing on the tubular portion and supported in the insert rotatably carrying the core in the insert, and packing means between the inner end portion of the core and the insert, the head having a port in communication with the tubular portion of the core, the bearing being an anti-friction bearing with a race in the insert, a race on the core and bearing elements between the races, the ring having a portion retaining the first-mentioned race in the insert.

4. A fluid handling structure including, an elongate body with a socket entering it from one end, the socket having a mouth portion at the end terminating at a shoulder and a counterbore extending in from the shoulder and terminating at the bottom of the socket, there being a fluid handling port in the body communicating with the inner end portion of the counterbore, an insert in the socket with a middle portion in the outer end of the counterbore, an inwardly convergent inner portion extending inward from the middle portion and terminating short of the bottom, and an outer portion extending forward from the middle portion and terminating in the mouth portion, a flange on the insert supported by the shoulder, a clamp ring threaded in the mouth portion clamping the flange toward the shoulder, a core with a head outward of the end of the body and a tubular portion in the insert and terminating short of the bottom, a bearing on the tubular portion and supported in the insert rotatably carrying the core in the insert, and packing means between the inner end portion of the core and the insert, the head having a port in communication with the tubular portion of the core, the packing means including, a packing ring around the core and in the insert and a compression ring in the insert bearing on the packing ring and having spaced lugs bearing on the bottom of the socket.

5. In combination, a frame, a rotor, means pivotally mounting the rotor from the frame, a fluid handling duct stationary with the frame, a fluid handling duct stationary with the rotor, the rotor having a portion with a lateral recess in it entering it from one side and intersecting the pivotal axis of the rotor, and a fluid handling coupling carried by the rotor and having fluid handling elements coupled for relative movement about an axis coaxial with the rotor, one element being in connection with one duct and the other element being in connection with the other duct.

6. In combination, a frame, a rotor having a trunnion, means pivotally mounting the rotor from the frame including a bearing supporting the trunnion, a fluid handling duct stationary with the frame, a fluid handling duct stationary with the rotor, the trunnion having a recess in it intersecting the pivotal axis of the trunnion, and a fluid handling coupling carried by the rotor and having fluid handling elements coupled for relative movement about an axis coaxial with the rotor, one element being in connection with one duct and the other element being in connection with the other duct.

7. In combination, a frame, a rotor having a trunnion, means pivotally mounting the rotor from the frame including a bearing supporting the trunnion, a fluid handling duct stationary with the frame, a fluid handling duct stationary with the rotor, the trunnion having a recess in it intersecting the pivotal axis of the trunnion, and a fluid handling coupling carried by the rotor and having fluid handling elements coupled for relative movement about an axis coaxial with the rotor, one element being in connection with one duct and the other element being in connection with the other duct, one element being an elongate body with a socket entering it from one end and mounted on the trunnion to be in the recess and the other element being a core with a portion in the socket concentric with the trunnion and supported in the socket by a bearing.

8. In combination, a frame, a rotor having a trunnion with a recess therein intersecting the axis of the trunnion, a mounting pivotally supporting the trunnion from the frame, two ducts stationary with the frame, two other ducts stationary with the rotor, and a fluid coupling in the recess with a body stationary in the recess and receiving the said other ducts and cores adapted to pivot in the body on the axis of the trunnions, each in communication with a respective one of said other ducts and with a respective one of the first-mentioned ducts.

References Cited in the file of this patent

UNITED STATES PATENTS

| | | |
|---|---|---|
| 1,503,925 | Socia | Aug. 5, 1924 |
| 1,697,261 | Daughs | Jan. 1, 1929 |
| 2,001,566 | Brunner | May 14, 1938 |
| 2,270,928 | Browne | Jan. 27, 1942 |
| 2,362,581 | Newcomb | Nov. 14, 1944 |
| 2,378,329 | Rotter | June 12, 1945 |
| 2,459,981 | Warren | Jan. 25, 1949 |
| 2,489,441 | Warren | Nov. 29, 1949 |
| 2,511,021 | Stockdale | June 13, 1950 |
| 2,518,216 | Barker | Aug. 8, 1950 |

FOREIGN PATENTS

| | | |
|---|---|---|
| 273,813 | Great Britain | July 11, 1927 |
| 788,186 | France | July 22, 1935 |

UNITED STATES PATENT OFFICE
CERTIFICATE OF CORRECTION

Patent No. 2,781,055                                                    February 12, 1957

Donald M. Jackson

It is hereby certified that error appears in the printed specification of the above numbered patent requiring correction and that the said Letters Patent should read as corrected below.

Column 1, line 43, for "rotatable" read -- pivotally movable --.

Signed and sealed this 21st day of October 1958.

(SEAL)

Attest:

KARL H. AXLINE                                                               ROBERT C. WATSON

Attesting Officer                                                     Commissioner of Patents